Sept. 13, 1949.  L. B. CHERRY  2,481,905
POWER REGULATING BRIDGE NETWORK
Filed June 7, 1945
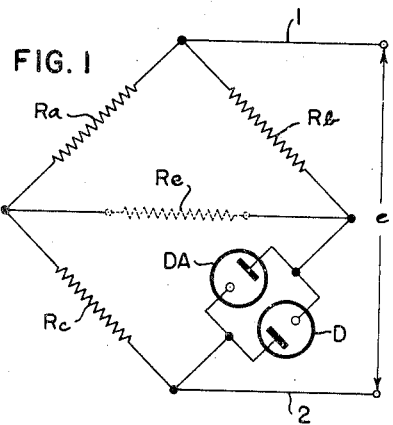
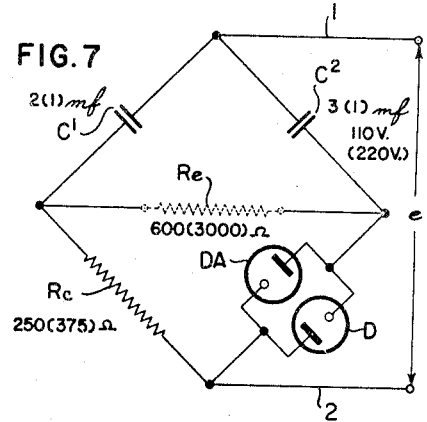
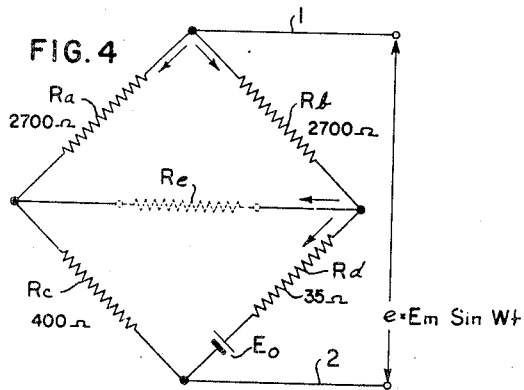
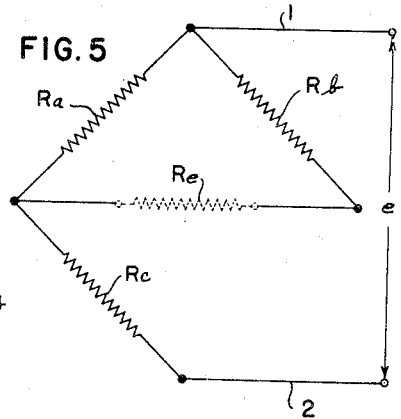
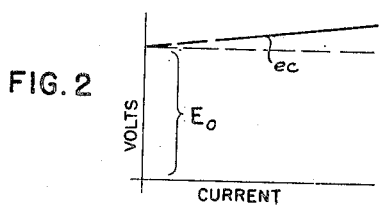
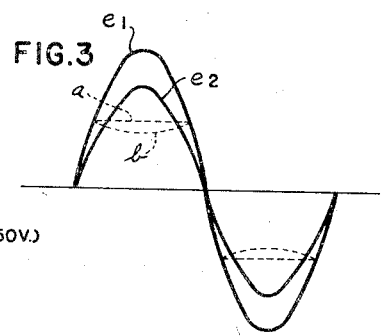
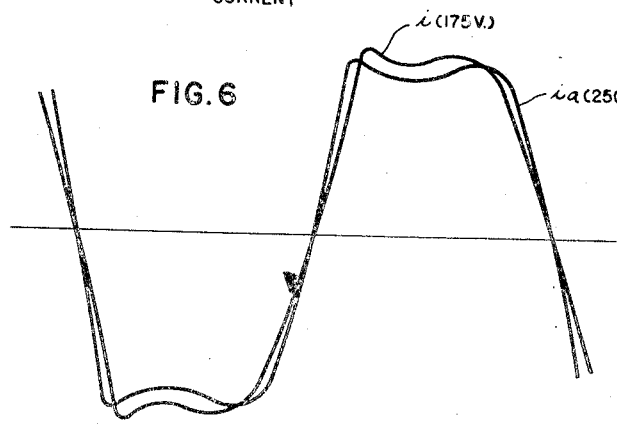
INVENTOR.
LLOYD B. CHERRY
BY
ATTORNEY.

Patented Sept. 13, 1949

2,481,905

UNITED STATES PATENT OFFICE 2,481,905

POWER REGULATING BRIDGE NETWORK

Lloyd B. Cherry, Philadelphia, Pa., assignor, by mesne assignments, to Minneapolis-Honeywell Regulator Company, Minneapolis, Minn., a corporation of Delaware Application June 7, 1945, Serial No. 598,069

12 Claims. (Cl. 323—75)

My present invention relates to improvements in electrical power regulating apparatus.

A general object of the invention is to provide improved regulating means operative to substantially prevent the flow of power to a load device, from alternating current supply lines, from fluctuating as a result of ordinary supply line voltage and frequency variations.

Another object of the invention is to provide a power regulator which is operative to deliver substantially constant power to a load device from a source supplying alternating current waves gradually varying in amplitude in a regularly recurring manner, for example, according to the law of sines, notwithstanding ordinary voltage and frequency fluctuations in said source.

A further object of the invention is to provide a regulator operative to substantially prevent the effective or root-mean-square (R. M. S.) voltage applied to a load device from an alternating voltage source, from fluctuating as a result of ordinary variations in voltage and frequency of said source.

A more specific object of the invention is to provide a regulator for the purpose specified in which novel and effective use is made of the voltage regulating capacity of a gaseous discharge tube to control power or wattage, as distinguished from the control of voltage.

My improved power regulator, considered in its broader aspects, comprises a voltage amplitude limiter for limiting to a predetermined value the peak amplitude of each half wave of the voltage waves impressed on the load device from the alternating current supply source. In the embodiment of my invention now preferred by me, the voltage amplitude limiter comprises a pair of gaseous discharge tubes connected back to back. However, as will be evident to those skilled in the art, other types of voltage amplitude limiters may be employed, if so desired.

By virtue of the action of the voltage amplitude limiter, the half waves of voltage impressed on the load device are trapezoidal in shape when the alternating current waves supplied by the source gradually vary in amplitude in a regularly recurrent manner, for example, according to the law of sines. Thus, the slopes of the non-parallel sides of each half wave, and thereby, the effective or R. M. S. value of the voltage applied to the load device, tend to vary in accordance with the peak amplitude of the voltage supplied by the source. Consequently, the power delivered to the load device tends to fluctuate correspondingly since the power delivered varies directly with the second power or square of the R. M. S. value of the voltage applied to the load device.

In order to substantially prevent the occurrence of such fluctuations in the power delivered to the load device upon variation in the peak amplitude of the voltage of the supply source, auxiliary means are provided in the regulator of my invention to modify the shape of each half wave of voltage applied to the load device from the source as required to maintain substantially constant the R. M. S. value of voltage applied to said device. Specifically, the auxiliary means operates to "scoop out" varying amounts of the area subtended by the trapezoidal half waves applied to the load device as is required to maintain the R. M. S. voltage constant notwithstanding the variations in peak amplitude of the supply voltage. Accordingly, the power delivered to the load device is also maintained constant inasmuch as the square of the R. M. S. voltage then is also a constant.

In passing it is noted that the R. M. S. voltage of a voltage wave is the square root of the mean of the squares of the ordinates of the wave. Consequently, when the R. M. S. voltage of the various trapezoidal half waves obtained is maintained constant notwithstanding fluctuations in the peak amplitude of the voltage source, the areas subtended by the different waves obtained by squaring the ordinates of the trapezoidal half waves are also constant.

Due to inherent limitations of gaseous discharge tubes, my novel regulator described herein has a rather small output, but is nevertheless well adapted for certain uses of practical importance. For example, it is well adapted for use in regulating the supply of heating current to the filaments of vacuum tubes so as to maintain constant emission from the tube cathodes. Such regulation is particularly desirable in controlling the cathode emission in D. C. amplifier tubes. The devices most commonly used for stabilizing low wattage A. C. power supplied by commercial power lines are open to one, at least, of the following objections: they have a time lag before compensation is effected; their operation is dependent upon the constancy of line frequency; and they weigh and cost too much. My novel regulator is substantially free from each of the foregoing objections.

I was not the first to propose the use of a gaseous discharge tube for regulating purposes analogous to those for which my present invention was devised, but my invention is capable of substantially better regulation results than are obtainable with any gaseous discharge tube regulator previously used or proposed for use for such purposes, of which I have knowledge. One such prior gaseous discharge tube regulator is described and its characteristics and performance are compared with those of a regulator embodying my present invention, in a paper written jointly by me and R. F. Wild, and printed on pages 262-267 of the April, 1945 issue of Proceedings of the I. R. E. (Institute of Radio Engineers, Inc.).

My invention is characterized by the inclusion of a gaseous discharge tube impedance in one arm of a bridge circuit which is suitably unbalanced and has a load resistance connected to a pair of conjugate points of the bridge. For the purposes of the present invention the bridge unbalance is suitable when it causes fluctuations in an alternating potential impressed on the second pair of conjugate bridge points to produce fluctuations in the effective current flow through the load resistance, during periods in which said gaseous tube impedance is conductive, which substantially compensate for the reverse fluctuations in the effective load current which said potential fluctuations produce during periods in which said gaseous discharge tube impedance is non-conductive.

In the preferred form of the invention, the gaseous discharge tube impedance in said one arm of the bridge is provided by two gaseous discharge tubes connected back to back in the bridge arm so that one tube may be conductive during a portion of one-half, and the other tube may be conductive during a portion of the other half of each potential alternation cycle. The impedance in each of the other three arms may each, be in the form of a non-reactive resistance, but better regulator efficiency is obtainable when the two of said other bridge arms which are directly connected to the same line conductor have their respective impedances in the form of condensers.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a circuit diagram illustrating one form of my regulator;

Fig. 2 is a graph showing the voltage-current regulation characteristic of a gaseous discharge tube;

Fig. 3 is a comparative diagram showing the trapezoidal wave shapes produced when two different line voltages are impressed on the gaseous discharge tubes;

Fig. 4 is a circuit diagram in which the gaseous discharge tubes shown in Fig. 1 are replaced by an equivalent circuit portion;

Fig. 5 is a circuit diagram differing from that shown in Fig. 1 by the omission of the bridge arm including the gaseous discharge tubes;

Fig. 6 is a comparative diagram comprising two load current oscillograms produced when two different line voltages are impressed on my regulator; and Fig. 7 is a diagram illustrating a modified form of the invention.

In the form of my invention illustrated diagrammatically in Fig. 1, resistances $R_a$, $R_b$, and $R_c$ are respectively included in, and in effect form, three arms of a bridge circuit which includes gaseous discharge tubes D and DA in its fourth arm. As shown, the tubes D and DA differ from one another only in that they are connected back to back so that each may become conductive during an alternating current half cycle in which the other tube is non-conductive.

The bridge is energized by alternating current line conductors 1 and 2 between which an alternating potential difference or voltage $e$ is maintained. As shown, the conductor 1 is connected to the bridge at the junction point of its arms $R_a$ and $R_b$, and the conductor 2 is connected to the junction point of the bridge arm $R_c$ with the bridge arm including the tubes D and DA. A load resistance $R_e$ is connected between the other conjugate bridge junction points, that is, between the junction point of the arms $R_a$ and $R_c$ and the junction point of the arm $R_b$ and the bridge arm including the tubes D and DA.

A cursory inspection of the voltage-current regulator characteristic of Fig. 2 is sufficient to reveal that the gaseous discharge tubes D and DA are essentially voltage amplitude limiting devices. In Fig. 2 the straight full line $ec$ represents the voltage produced across the terminals of the gaseous discharge tubes D and DA when the supply line voltage $e$ is applied to the bridge of Fig. 1. The left end of curve $ec$ indicates the lowest voltage at which the tube conducts. A peak corresponding to the firing or striking voltage of the tube also occurs at the left end of the characteristic $ec$, but has not been shown for purposes of simplicity. It will be noted that the tubes D and DA tend to maintain approximately constant the voltage drop across their terminals, regardless of the current conducted through the tubes. The slight rise in voltage with increase in current conducted by the tubes is due to the internal resistance of the tubes.

The voltage drop produced across the output terminals of the tubes D and DA is of smaller amplitude than the peak values of the alternating potential $e$, as is illustrated in Fig. 3 wherein curves $e1$ and $e2$ represent two different values which the potential supplied by conductors 1 and 2 may assume. The dotted line $a$ in Fig. 3 represents the approximately constant and predetermined voltage value which the tubes D and DA tend to maintain across their terminals regardless of the peak amplitude of the applied line voltage. When the gaseous discharge tubes D and DA are connected in an arm of a bridge circuit, as shown in Fig. 1, they tend to limit to some predetermined value, necessarily less than the value $a$, the amplitude of the voltage drop maintained across the load resistance $R_e$.

In Fig. 3 it will be noted that the wave shape of each half cycle of the voltage derived from the supply conductors 1 and 2, and thereby impressed on the load resistance $R_e$ by virtue of the action of the gaseous discharge tubes D and DA, is substantially trapezoidal in character. In addition, it will be noted that the slopes of the non-parallel sides, and thereby the area defined by each trapezoidal half wave, vary in accordance with the peak amplitude of the applied line voltage. Thus, the area of the trapezoidal wave shape obtained with line voltage $e1$ is greater than the area obtained with the line voltage $e2$ when the peak amplitude of voltage $e1$ is greater than the peak amplitude of voltage $e2$, as shown in Fig. 3. Consequently, the effective or root mean square voltage of each trapezoidal half wave also varies in accordance with the corresponding peak amplitude of the applied voltage.

As those skilled in the art will understand, this difference in effective or root mean square voltage of each half cycle of trapezoidal wave shape obtained when the peak amplitude of the line voltage fluctuates, renders gaseous discharge tubes unsuitable per se as power regulating devices, even though they may be operative to a high degree of accuracy to maintain the peak amplitude of the voltage across their terminals substantially constant notwithstanding line voltage changes. Effective use is made of gaseous discharge tubes in the power regulator of my invention, however, by so associating and relating the gaseous discharge tubes D and DA to the bridge arms Ra, Rb, and Rc, that upon changes in the peak amplitude of the applied line voltage the shape of the trapezoidal half waves is modified, as indicated by the dotted line b, as required to hold constant the effective or root mean square value of the voltage of the trapezoidal half waves. The manner in which this action is obtained will become apparent as the description proceeds.

As is well known, the equivalent circuit for a gaseous discharge tube consists of a resistance in series with a source of electromotive force opposing current flow in the direction in which the current flows through the tube. Fig. 4 differs from Fig. 1 in that in Fig. 4 the tubes D and DA of Fig. 1 are replaced by an electromotive force Eo and a resistance Rd, which constitute the equivalent circuit for the tube D when the direction of current flow through the bridge arms is that indicated by the arrows in Fig. 4. The electromotive force Eo, as shown in Fig. 2, is somewhat smaller than the lowest voltage at which the tube conducts and is the theoretical voltage value at which the current conducted by the tube just decreases to zero. In order to obtain the value of the electromotive force Eo, the voltage-current regulation characteristic shown in Fig. 2 is extended to the left as indicated by the dashed line, until it intersects the ordinate at which the tube current is zero. The equivalent circuit for the tube DA of Fig. 1 differs from the equivalent circuit for the tube D shown in Fig. 4 only in having the polarity of the electromotive force Eo reversed.

During the periods in which the instantaneous value of the alternating potential e is less than the electromotive force Eo neither of the tubes D and DA can be conductive. During such periods the bridge arm including those tubes is inoperative and the circuit shown in Fig. 1 is then operatively equivalent to the circuit shown in Fig. 5, since the physical difference between the two circuits does not change the magnitudes of any of the currents flowing in the various resistances Ra, Rb, Rc, and Re during the periods in which neither tube is conductive.

For the purpose of simplifying a theoretical analysis of the different operative conditions prevailing in the circuit shown in Fig. 1 when the tubes D and DA are, and are not, conductive, certain slightly erroneous assumptions may be advantageously made in deriving the hereinafter mentioned Equations 1, 2, 3, 4, and 5. The errors in those assumptions are relatively small from the quantitative standpoint, and without real significance from the qualitative analysis standpoint. The assumptions which are made, are: (a) The assumption that each of the tubes D and DA becomes conductive and ceases to become conductive when the instantaneous value of the voltage e respectively rises to and falls below the value Eo; (b) the assumption that the values of the load current immediately before and immediately after the tube becomes conductive and immediately before and immediately after it ceases to become conductive are the same; (c) the assumption that the ignition and extinction of each of the gas tubes occur at the same time interval $t'$ before and after the corresponding peak value of the voltage supplied to the tube; and (d) the assumption that the internal impedance of the power source, which in the case of a commercial power line is very low, may be disregarded.

By the application of Kirchoff's laws to the circuit shown in Figs. 1, 4 and 5 the following equations may be derived for determining the instantaneous load currents Ie and Ie', respectively, flowing through said load resistance when neither or one of the tubes D and DA is conductive.

(1) $$Ie = \frac{e}{Rc + \left(1 + \frac{Rc}{Ra}\right)(Rb + Re)}$$

(2) $$Ie' = \frac{e\left(\frac{Ra}{Rb} - \frac{Rc}{Rd}\right) + Eo\left(\frac{Ra + Rc}{Rd}\right)}{Rc\left(\frac{Ra}{Rb} - \frac{Rc}{Rd}\right) + (Ra + Rc) + \left(\frac{Re + Rc}{Rd}\right) + \left(\frac{Rb + Re}{Rb}\right)}$$

In the foregoing Equation 2, e is the instantaneous line voltage and is the only variable, and it is apparent from inspection that the factor $$\frac{Ra}{Rb} - \frac{Rc}{Rd}$$

can be made negative by so unbalancing the bridge circuit that $$\frac{Ra}{Rb}$$

is made smaller than $$\frac{Rc}{Rd}$$

The effect of thus making the quantity multiplied by the variable e, a negative quantity instead of a postive quantity, is to make the current Ie' flowing through the load resistor during the periods in which one or the other of the tubes D and DA is conductive smaller when the fluctuating potential e is relatively high than when it is relatively low.

It is apparent from inspection of the foregoing Equation 1, that a fluctuation in the line voltage e will increase or decrease the load resistance current Ie, accordingly as that fluctuation is an increase or a decrease. Preferably, the constant quantities of Equation 2 are so chosen that the numerator term $$Eo\frac{(Ra + Rc)}{Rd}$$

is substantially greater than the first numerator term $$e\left(\frac{Ra}{Rb} - \frac{Rc}{Rd}\right)$$

to the end that the increase or decrease in the load current Ie' produced by a fluctuation of the applied line voltage e is just that required to compensate for the respective decrease or increase in the current $I_e$ produced by the same line voltage fluctuation. In general the factor $$\frac{Ra}{Rb} - \frac{Rc}{Rd}$$

in the foregoing Equation 2 should be of the order of $-10$ to $-20$. In such a circuit as is shown in Figs. 1 and 4, the value of the resistance $Rd$ is of the order of 35 ohms when commercial VR–150 gaseous discharge tubes are included in the circuit.

In Fig. 4 numerical values are indicated for the various resistances in the circuit. The resistances indicated are suitable for practical use with an effective voltage of 275 to 385 volts R. M. S. (root mean square). It is to be noted, however, that while the resistances shown in Fig. 4 should be suitably proportioned, there is nothing critical about any individual resistance, except that the value of the resistance $Rb$ should be so related to the peak value of the voltage $e$, as to avoid a maximum current flow through either tube D or DA high enough to injure that tube. The safe maximum current flows through the different commercial tubes are known.

The following Equations 3, 4, and 5 are power equations. Equation 3 gives the power, $P_1$, supplied to the load circuit when the tubes are non-conductive, and Equation 4 gives the power, $P_2$, supplied to the load circuit when one or the other of the tubes is conductive. Equation 5 gives the value of the total power, P, supplied to the load circuit when the tubes are non-conductive and when they are conductive.

(3) $$P_1 = \frac{1}{\frac{T}{4} - t'} Re \int_0^{\frac{T}{4} - t'} (Ie)^2 dt$$

(4) $$P_2 = \frac{1}{t'} Re \int_{\frac{T}{4} - t'}^{\frac{T}{4}} (Ie')^2 dt$$

(5) $$P = \frac{Re \int_0^{\frac{T}{4} - t'} (Ie)^2 dt' + Re \int_{\frac{T}{4} - t'}^{\frac{T}{4}} (Ie')^2 dt}{\frac{T}{4}}$$

Fig. 6 reproduces two oscillograms $i$ and $ia$ superposed for convenient comparison, $i$ illustrating the variations in the instantaneous load current during one complete cycle when the line voltage is 175 volts R. M. S., and $ia$ illustrating the instantaneous load current during a cycle when the line voltage is 250 volts R. M. S.

A phenomenon, illustrated by Fig. 6, causes the effective load current to increase slightly to a maximum value and then to decrease again as the line voltage amplitude is continuously increased through a predetermined operating range. This can be explained qualitatively by the fact that each gaseous discharge tube conducts during a portion of the cycle which increases as the peak amplitude of line voltage increases, so that the decrease in instantaneous load current during the tube conduction periods overcompensates for the increase in the instantaneous load current during the intervals in which the tubes are non-conductive. By adjusting the values of the resistors $Ra$, $Rb$, and $Rc$, the value of the line voltage amplitude at which the variation in the effective load current changes from an increase to a decrease, can be varied to suit the operating range. The effect just described contributes to the attainment of better regulation than could be obtained with a balanced bridge in which the effective load current increases continuously while the line voltage amplitude is increasing.

With the typical circuit constants indicated in Fig. 4, a 40 per cent change in applied voltage produces a change of about 1 per cent in an effective load current of approximately 27 milliamperes. In such case, the efficiency of the circuit is between 4 per cent to 8 per cent, dependent upon the applied voltage. This low efficiency is largely due to power dissipation in the resistors $Ra$ and $Rb$.

Much better circuit efficiency is obtainable with the form of my invention illustrated in Fig. 7 in which the resistors $Ra$ and $Rb$ of Fig. 1 are replaced by condensers $C'$ and $C^2$. The theory and principles of operation for the bridge circuit arrangement shown in Fig. 7 are the same as for the resistance bridge circuit shown in Fig. 1. In Fig. 7, typical circuit constants are indicated for operation with 110 volt and 220 volt power line voltages, respectively, the values of the constants indicated for the higher power line voltage being bracketed.

In tests illustrating the performance of the arrangement shown in Fig. 7 when supplying the load current required for the heater resistance of a type 6P5 vacuum tube it was found that for both 110 volt and 220 volt power line voltages, the change in effective load current was ± .35 per cent for a 10 per cent change in the nominal line voltage. In said tests, the nominal effective load currents with the two power line voltages were 73 milliamperes and 32 milliamperes, respectively. Without regulation, the changes in effective load current would have been 10 per cent instead of .35 per cent, so that with my regulator the change in effective load current was about ¹⁄₂₈ of what it should have been without regulation. Finally, the effect of the regulation on the plate current of the 6P5 type vacuum tube, was to reduce the plate current variation for a 10 per cent change in the power line voltage of 110 volts, from 4 per cent to .01 per cent. Thus, the plate current variation without regulation was found to be four hundred times the plate current variation when regulated by means of the circuit shown in Fig. 7. The efficiency of the regulator shown in Fig. 7 varies from 30 to 50 per cent, depending upon whether the line voltage amplitude is low or high. Since the values of the capacitances used in the circuit shown in Fig. 7 are not critical, the bridge operation is substantially independent of the power line frequency. Furthermore, the arrangement shown in Fig. 7 operates without time lag, and is capable of handling any power which the current capacities of the gas discharge tubes will permit.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is as follows:

1. Alternating power regulating apparatus comprising a circuit network having input terminals adapted for connection to a source of alternating current of wave form varying in shape substantially according to the law of sines and including a load device to which substantially constant power is to be supplied, the voltage of said alternating current source being variable, a voltage amplitude limiting means connected to said load device in said circuit network and operating to limit to a predetermined value the peak amplitude of the voltage impressed on said load device whereby the shape of the voltage waves impressed on said load device is trapezoidal in character, the slopes of the non-parallel sides of the trapezoidal waves and thereby the area sub-tended by said waves varying according to the peak amplitude of the voltage applied to said input terminals, and electrical impedance elements connected to said load device and having values to cooperate with said voltage amplitude limiting means in modifying the shapes of the voltage waves impressed on said load device as required to maintain the square root of the mean of the squares of the ordinants of said last mentioned waves substantially constant.

2. Alternating power regulating apparatus comprising a circuit network having input terminals and including a load device to which power is indirectly supplied by a source which directly supplies to said terminals waves of alternating current varying in shape substantially according to the law of sines, the voltage of said alternating current source being variable, separate impedance elements included in said network and connecting each end of said load device to one of said terminals, a third impedance element connecting one end of said load device to the second terminal, a voltage amplitude limiting means having one end connected to one end of said device through the last mentioned impedance element, and having its other end connected to the other end of said device independently of said impedance elements, said voltage amplitude limiting means operating to limit to a predetermined value the peak amplitude of the voltage impressed on said load device from said source, whereby the shape of the voltage waves impressed on said load device is trapezoidal in character, the slopes of the non-parallel sides of the trapezoidal waves and thereby the area sub-tended by said waves varying according to the peak amplitude of the voltage of said source, said impedance elements having values to cooperate with said limiting means in modifying the shapes of the voltage waves impressed on said load device as required to maintain the square root of the mean of the squares of the ordinates of said last mentioned waves substantially constant.

3. Alternating power regulating apparatus comprising a circuit network to which power is supplied from a source supplying regularly recurring waves of alternating current of gradually varying amplitude, the voltage of said alternating current source being variable, a load device, voltage amplitude limiting means, and voltage wave modifying means, said voltage amplitude limiting means being arranged to limit to a predetermined value the amplitude of the voltage impressed on said load device from said source whereby the shape of the voltage waves impressed on said load device is substantially trapezoidal in character, the slopes of the non-parallel sides of the trapezoidal waves varying in accordance with the peak amplitude of the voltage of said source whereby the R. M. S. voltage of said trapezoidal waves also tends to vary according to the peak amplitude of the voltage of said source, and said modifying means being arranged to cooperate with said amplitude limiting means to modify the shapes of the voltages waves impressed on said load device as required to maintain the R. M. S. voltage of said last mentioned waves substantially constant.

4. A regulator as specified in claim 3, in which said voltage amplitude limiting means is comprised of gaseous discharge tube means.

5. A regulator as specified in claim 3, in which said voltage amplitude limiting means is comprised of two gaseous discharge tubes connected back to back, and in which said means associated with said amplitude limiting means is comprised of an unbalanced bridge circuit including said gaseous discharge tubes in one arm, said load device connected between one pair of conjugate terminals, and having the source of alternating current applied to the other pair of conjugate terminals.

6. An alternating current power regulator comprising an unbalanced bridge having a gaseous discharge tube in one of its four arms and having impedances in each of its other arms and having a load resistance connecting a conjugate pair of its bridge arm junctions, and means for maintaining between the other two bridge arm junctions an alternating potential difference of sufficient magnitude to create current flow through a portion of one half of each cycle of alternation, the relative values of said impedance and the characteristics of said tubes being related to so unbalance the bridge that fluctuations in the effective value of said potential produce variations in the current flow through the load resistance during periods in which the tube is not conductive, which are opposite in direction to the variations in said current flow produced by said fluctuations during the periods in which said tube is conductive.

7. A regulator as specified in claim 6, in which the said tube is connected back to back with a second gaseous discharge tube, so that said second tube may be conductive during half cycles alternating with the half cycles during which the first mentioned tube is conductive.

8. A regulator as specified in claim 6 in which the impedance in each of the two bridge arms having one end connected to one end of the other and having their other ends respectively connected to the two ends of the load resistance, comprises a condenser.

9. Alternating power regulating apparatus comprising a circuit network having input terminals adapted for connection across a source of alternating current of wave form varying in shape substantially according to the law of sines, the voltage of said source being variable, a load device, a voltage limiting means and an impedance element included in said network, with said load device and said limiting means connected between said terminals in parallel with one another and each in series with said impedance, and other impedance means included in said network and cooperating with said voltage limiting means to modify the shapes of the voltage waves impressed on said load device as required to maintain the square root of the mean of the squares of the ordinates of said last mentioned waves substantially constant.

10. An alternating current power regulator comprising an unbalanced bridge having electron discharge means in one only of its four arms and having an impedance in each of its other three arms and having a load resistance connecting a conjugate pair of its bridge arm junctions and means for maintaining between the other two bridge arm junctions an alternating potential difference of significant magnitude to create current flow through said one arm during a portion of each cycle of alternation, said electron discharge means including at least one gaseous discharge tube.

11. A regulator as specified in claim 10, in which said electron discharge means consists of two gaseous discharge diodes with the anode and cathode of each diode connected to the cathode and anode respectively of the other diode.

12. A regulator as specified in claim 10, in which impedance in the bridge arm connecting one end of the load resistance to the end of the bridge arm including the electron discharge means which is not directly connected to the second end of the load resistance, consists wholly of resistance.

LLOYD B. CHERRY.

REFERENCES CITED

The following references are of record in the file of this patent:

UNITED STATES PATENTS

| Number | Name | Date |
| --- | --- | --- |
| Re. 14,585 | Arnold | Jan. 14, 1919 |
| 1,893,780 | Lyman | Jan. 10, 1933 |

OTHER REFERENCES

Publication entitled, "Electronic Alternating Current Power Regulation," by L. B. Cherry and R. F. Wild, reprinted from Proceedings of I. R. E. vol. 337, No. 4, Apr. 1945.